United States Patent
Miga et al.

(10) Patent No.: US 7,818,558 B2
(45) Date of Patent: Oct. 19, 2010

(54) METHOD AND APPARATUS FOR EFI BIOS TIME-SLICING AT OS RUNTIME

(76) Inventors: Andy Miga, 231 Clay Ct. SW., Olympia, WA (US) 98513; Vincent J. Zimmer, 1937 S. 369th St., Federal Way, WA (US) 98003; Michael A. Rothman, 11905 183rd St. East, Puyallup, WA (US) 98374

( * ) Notice: Subject to any disclaimer, the term of this patent is extended or adjusted under 35 U.S.C. 154(b) by 1114 days.

(21) Appl. No.: 11/444,940

(22) Filed: May 31, 2006

(65) Prior Publication Data
US 2007/0283138 A1 Dec. 6, 2007

(51) Int. Cl.
G06F 9/24 (2006.01)
G06F 15/177 (2006.01)

(52) U.S. Cl. .............. 713/2; 713/1; 713/100; 710/260; 710/263; 710/264

(58) Field of Classification Search .............. 713/1, 713/2, 100; 710/260, 263, 264
See application file for complete search history.

(56) References Cited

U.S. PATENT DOCUMENTS

| | | | |
|---|---|---|---|
| 6,732,264 B1 * | 5/2004 | Sun et al. ............... | 713/2 |
| 7,305,668 B2 * | 12/2007 | Kennedy et al. ............ | 717/168 |
| 2003/0110369 A1 | 6/2003 | Fish et al. | |
| 2003/0188173 A1 | 10/2003 | Zimmer et al. | |
| 2004/0123086 A1 * | 6/2004 | Rothman et al. ............... | 713/1 |
| 2005/0015430 A1 * | 1/2005 | Rothman et al. ............ | 709/201 |
| 2005/0044363 A1 * | 2/2005 | Zimmer et al. .............. | 713/170 |
| 2005/0204357 A1 | 9/2005 | Garg et al. | |
| 2006/0282689 A1 * | 12/2006 | Tipley ........................ | 713/300 |

OTHER PUBLICATIONS

U.S. Appl. No. 11/227,831, filed Sep. 15, 2005, Marisetty et al.
UEFI Specification v2 (available at http://www.uefi.org), section 2.2.2 and chapter 7, Jan. 31, 2006.

* cited by examiner

*Primary Examiner*—Thomas Lee
*Assistant Examiner*—Michael J Brown
(74) *Attorney, Agent, or Firm*—David P. McAbee (57) ABSTRACT

A method and apparatus is described herein for executing firmware tasks during OS runtime. A thread slices execution time among entries in a control structure, such as process control block (PCB), maintained by an OS kernel. An entry in the control structure includes a reference to a firmware task, such as a system management operation, a BIOS task, and/or and EFI task. Based on that entry, the thread allocates an amount of execution time either directly to the firmware task or to a kernel mode driver to perform the firmware task.

27 Claims, 7 Drawing Sheets

METHOD AND APPARATUS FOR EFI BIOS TIME-SLICING AT OS RUNTIME

FIELD

This invention relates to the field of electronic systems and, in particular, to execution flow in electronic systems.

BACKGROUND

Non-volatile memories, such as flash EPROM (erasable programmable read-only memory) devices have developed into a popular source of memory in a wide range of digital applications. Flash memory devices typically allow for high memory densities, high reliability, and low power consumption. These characteristics have made flash memory very popular for low power applications, such as embedded memory circuits. Common uses of non-volatile memory include portable computers, personal digital assistant (PDA) devices, digital cameras, cellular telephones, TV boxes, routers, copy machines, and any number of other consumer products. In these devices, both program code and system data, such as configuration parameters and other firmware, are often stored in flash memory, because of the compact storage and relative ease of software upgradeability.

Non-volatile memories are also often used in these systems to store modular and upgradeable information, such as basic input/output system (BIOS) code, so pieces of the platform may be updated without having to frequently replace components in the system. Traditionally, BIOS' primary function was to boot a computer system, which entailed recognition and loading of various system hardware components, in preparation for other programs or code, such as an operating system, to assume control. An extensible firmware interface (EFI) has also been developed to allow operating system independent drivers to interface with system hardware components/devices.

In addition, to the traditional usage of EFI and BIOS to boot a computer system, both have also been used at operating system (OS) runtime, i.e. the duration of an operating system's execution. For example, many platforms include a system management mode (SMM), which performs firmware tasks in response to system management interrupts (SMIs). As a specific example, a device inserted at runtime is detected by firmware and a system management interrupt is generated to notify an OS of the insertion. However, SMM is often imposed across all processors and steals valuable execution cycles away from executing applications. In addition, as SMIs are often generated asynchronously in response to system events, an OS is not able to predictably provide Quality of Service (QoS).

BRIEF DESCRIPTION OF THE DRAWINGS

The present invention is illustrated by way of example and not intended to be limited by the figures of the accompanying drawings.

FIG. 4b illustrates an embodiment of an entry in the control structure of FIG. 4a.

DETAILED DESCRIPTION

In the following description, numerous specific details are set forth such as examples of control structures, fields in entries of control structures, firmware devices, firmware tasks, etc. in order to provide a thorough understanding of the present invention. It will be apparent, however, to one skilled in the art that these specific details need not be employed to practice the present invention. In other instances, well known components or methods, such as basic input/output system (BIOS) implementation, extensible firmware interface (EFI) implementation, handler routines, microprocessor architecture, etc. have not been described in detail in order to avoid unnecessarily obscuring the present invention.

The method and apparatus described herein are for executing firmware tasks in a computer system during operating system (OS) runtime. Specifically, executing of firmware tasks during OS runtime is primarily discussed in reference to BIOS tasks executed on a multi-core processor. However, the methods and apparatus for are not so limited, as they may be implemented on or in association with any system or integrated circuit device, such as a portable digital assistant (PDA), cell phone, or other electronic device, as well as with other processors capable of single or multiple threads of execution.

Figure 1:
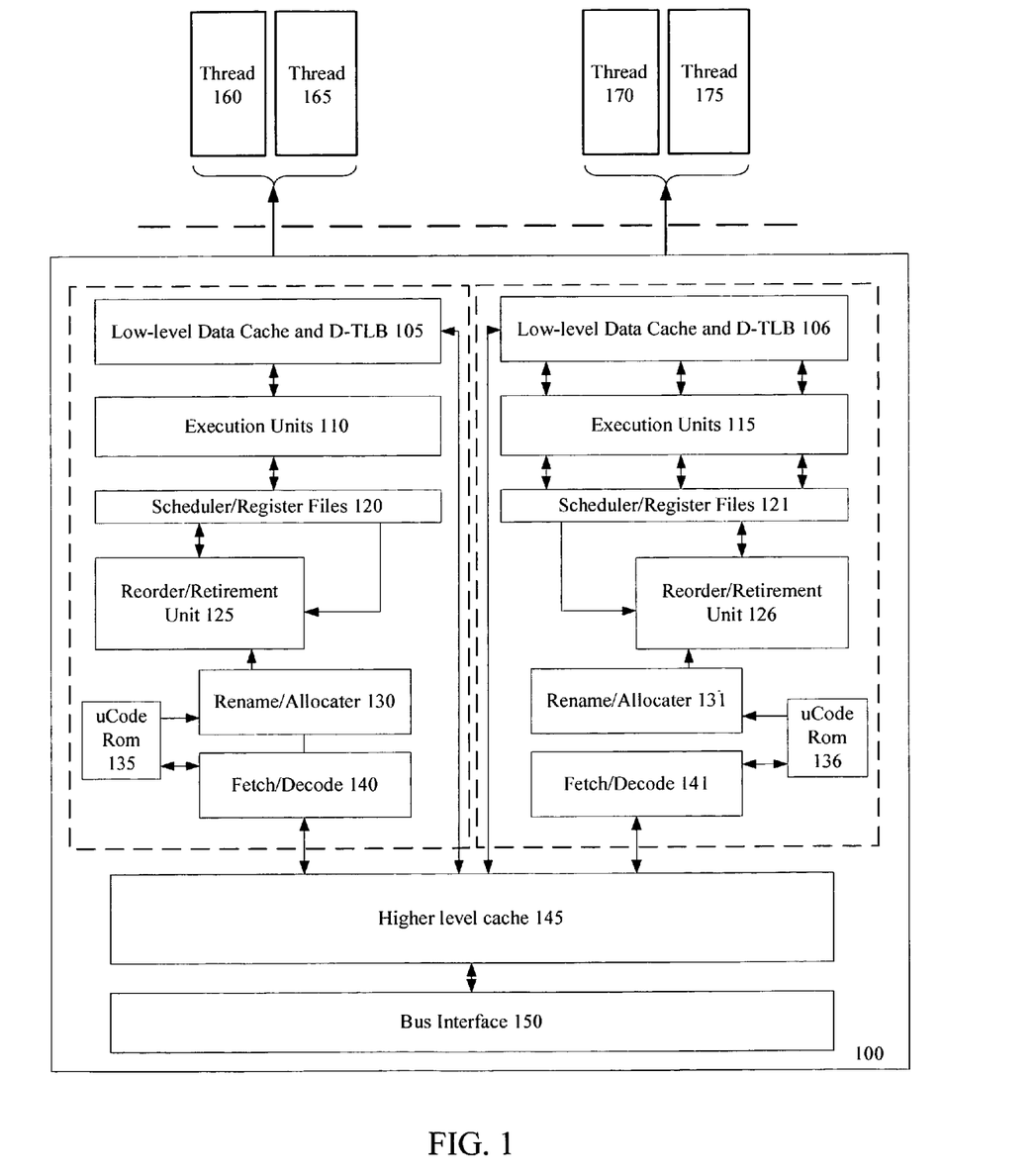
FIG. 1 illustrates an embodiment of a processor having two cores capable of executing multiple threads.

Referring to FIG. 1, an embodiment of multi-core processor 100, which is capable of allocating a slice of a thread's execution time to a firmware task, is illustrated. In the embodiment illustrated, processor 100 includes two cores, cores 101 and 102; although, any number of cores may be present. A core often refers to any logic located on an integrated circuit capable to maintain an independent architectural state, wherein each independently maintained architectural state is associated with at least some dedicated execution resources. For example, in FIG. 1, core 101 includes execution units 110, while core 102 includes execution units 115. Even though execution units 110 and 115 are depicted as logically separate, they may physically be arranged as part of the same unit or in close proximity. However, as an example, scheduler 120 is not able to schedule execution for core 101 on execution units 115.

In contrast to cores, a hardware thread typically refers to any logic located on an integrated circuit capable to maintain an independent architectural state, wherein the independently maintained architectural states share access to execution resources. As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Therefore, a processor, such as processor 100, is capable of executing multiple threads, such as thread 160, 165, 170, and 175. Although each core, such as core 101, is illustrated as capable of executing multiple software threads, such as thread 160 and 165, a core is potentially also only capable of executing a single thread.

In one embodiment, processor 100 includes symmetric cores 101 and 102. Here, core 101 and core 102 are similar cores with similar components and architecture. Alternatively, core 101 and 102 may be asymmetric cores with different components and configurations. Yet, as cores 101 and 102 are depicted as symmetric cores, the functional blocks in core 101 will be discussed, to avoid duplicate discussion in regards to core 102. Note that the functional blocks illustrated are logical functional blocks, which may include logic that is shared between, or overlap boundaries of, other functional blocks. In addition, each of the functional blocks are not required and are potentially interconnected in different configurations. For example, fetch and decode block 140 may include a fetch and/or pre-fetch unit, a decode unit coupled to the fetch unit, and an instruction cache coupled before the fetch unit, after the decode unit, or to both the fetch and decode units.

In one embodiment, processor 100 includes a bus interface unit 150 for communicating with external devices and a higher level cache 145, such as a second-level cache, that is shared between core 101 and 102. In an alternative embodiment, core 101 and 102 each include separate second-level caches.

Fetch, decode, and branch prediction unit 140 is coupled to second level cache 145. In one example, core 101 includes a fetch unit to fetch instructions, a decode unit to decode the fetched instructions, and an instruction cache or trace cache to store fetched instructions, decoded instructions, or a combination of fetched and decoded instructions. In another embodiment, fetch and decode block 140 includes a pre-fetcher having a branch predictor and/or a branch target buffer. In addition, a read only memory, such as microcode ROM 135, is potentially used to store longer or more complex decoded instructions.

In one example, allocator and renamer block 130 includes an allocator to reserve resources, such as register files to store instruction processing results. However, core 101 is potentially capable of out-of-order execution, where allocator and renamer block 130 also reserves other resources, such as a reorder buffer to track instructions. Block 130 may also include a register renamer to rename program/instruction reference registers to other registers internal to core 101. Reorder/retirement unit 125 includes components, such as the reorder buffers mentioned above, to support out-of-order execution and later retirement of instructions executed out-of-order. As an example, micro-operations loaded in a reorder buffer are executed out-of-order by execution units and then pulled out of the reorder buffer, i.e. retired, in the same order the micro-operations entered the re-order buffer.

Scheduler and register files block 120, in one embodiment, includes a scheduler unit to schedule instructions on execution units 110. In fact, instructions are potentially scheduled on execution units 110 according to their type and execution units 110's availability. For example, a floating point instruction is scheduled on a port of execution units 110 that has an available floating point execution unit. Register files associated with execution units 110 are also included to store information instruction processing results. Exemplary execution units available in core 101 include a floating point execution unit, an integer execution unit, a jump execution unit, a load execution unit, a store execution unit, and other known execution units. In one embodiment, execution units 110 also include a reservation station and/or address generation units. Furthermore, low-level data cache and D-TLB block 105 is coupled to execution units 110 to store recently used elements, such as data operands. Block 105 may also include a translation look-aside buffer (TLB) to translate virtual memory addresses to linear and/or physical addresses.

When thread 160 on core 101, is executing a task, an instruction issued by the task passes through the pipeline of core 101. A pipeline refers to the stages an instruction passes through during execution. Therefore, to provide a slice of thread 160's execution time on core 101 to a firmware task, executed instructions associated with the firmware task are given a slice of execution time on the pipeline/units of core 101.

Figure 2:
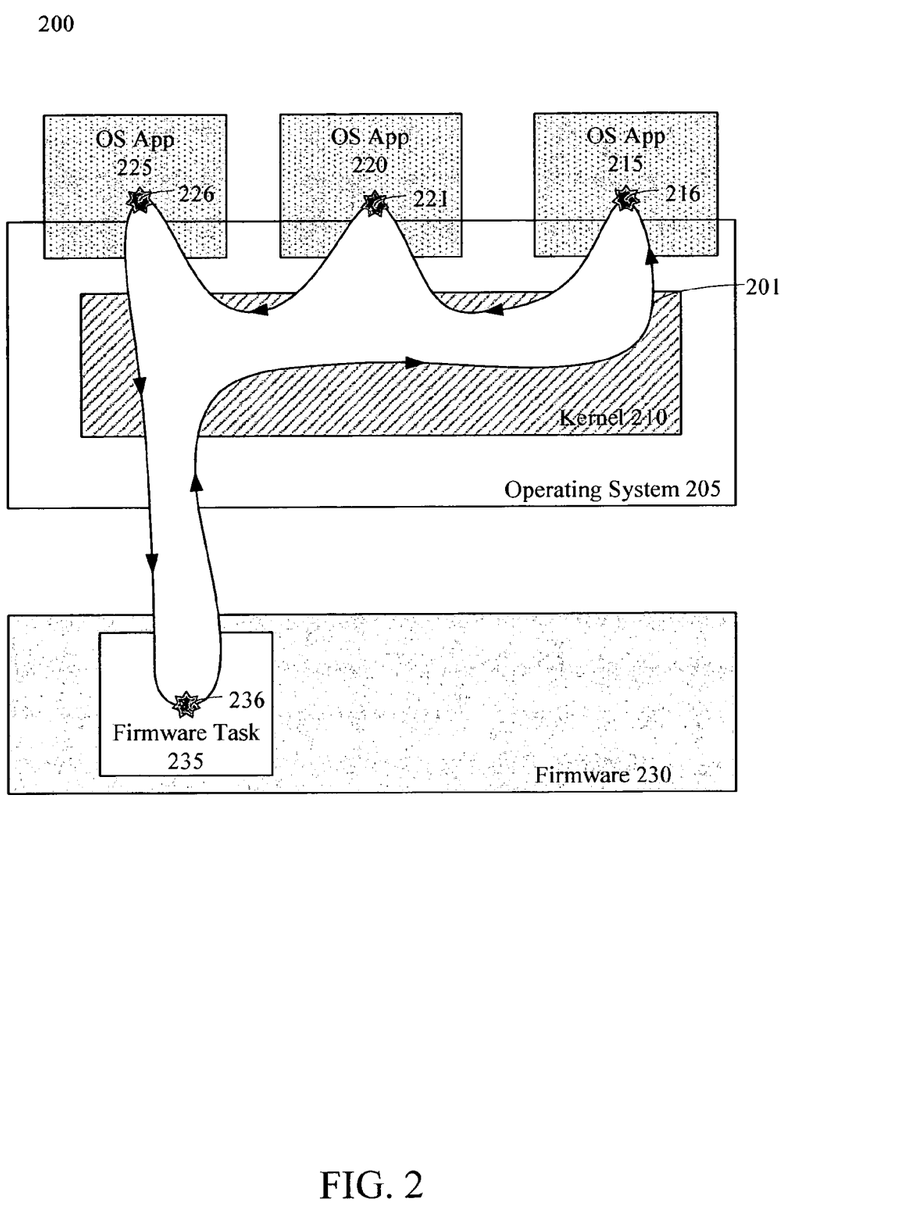
FIG. 2 illustrates an embodiment of a control path of an executing thread.

Turning to FIG. 2, control path 201 of a thread's execution on a processor is illustrated. As an example, control path 201 represents the execution of thread 160 on core 101, from FIG. 1. After initialization and boot of a system, control of the system if usually handed off to an operating system (OS), such as OS 205. Examples of operating systems include Microsoft's Windows, Linux, Unix, Mac OS, and other known operating systems. A core piece of an operating system's code is a kernel, which is typically responsible for communication between hardware and software during OS runtime. OS runtime referring to the duration of the OS 205's execution, where the kernel performs calls to tasks, such as applications, to begin their execution.

As in FIG. 2, when a thread slices time between multiple processes or tasks, the control path of the thread may be represented by control path diagram. A control path diagram illustrates a line representing an execution or control flow over time. As an example, assume a processor has initialized and basic input/output system (BIOS) handed off control to operating system (OS) 205. A thread executes kernel code 210, which performs a call to OS application 215. Application 215 begins to execute on the processor, as represented by the control path of the thread moving to execution point 216. Typically, after completing execution, execution returns to kernel 210. In one embodiment, completing execution includes returning to kernel 210 after an allocated amount of time executing a task/process. However, completing execution may also refer to completing certain operations tasks, calls, and/or returns.

Upon returning to kernel 210, a call to OS application 220 is made, and OS application 220 processes or tasks are executed, as illustrated by control path 201 moving to execution point 221. Similarly, the execution flow moves next to OS application 225 at execution point 226. Previously, during the execution flow, an asynchronously generated system management interrupt (SMI) potentially enters the processor into a system management mode (SMM), allowing firmware tasks to be executed. In one embodiment, firmware tasks, such as handling an SMI or performing a system management operation, are scheduled in a similar manner to OS application tasks. Here, control path 201 moves to firmware task 235 and execution point 236 from execution point 226.

As an illustrative example, an SMI for a power state reduction is generated during execution of an OS related task, such as OS application task 220 at execution point 221 in control path 201. Instead of interrupting the current control path, entering into a management mode, and handling SMI, the interrupt is potentially queued, stored, and/or scheduled. In one embodiment, the SMI is scheduled as a firmware task to be allocated a slice of the thread's execution time. As a result, when control path 201, reaches firmware task 235, the SMI is appropriately handled, which potentially includes reducing a power state, as requested. Essentially, the firmware process/task is being executed as a co-equal agent at OS runtime to be scheduled and executed by the OS instead of an interrupt priority.

In one embodiment, a firmware task is any OS independent task. An example of a firmware task discussed above includes a system management operation, such as handling a SMI or performing system management. Often an SMI is generated by hardware signaling or an I/O write to a location designated by the firmware to be acted on by a processor. Typically, generation of a SMI and entering SMM is done to emulate certain hardware, perform power management operations, or perform other system level functions.

As another example, a firmware task includes performing a BIOS task or an extensible firmware interface (EFI) task. EFI is an interface specification for interfacing with hardware, and specifically, for communication between an OS an hardware/firmware. Information on Unified Extensible Firmware Interface may be found at www.uefi.org. In one embodiment, EFI is implemented on top of BIOS or some portion of traditional BIOS. For example, traditional BIOS functions, such as Power On Self Test (POST), are implemented in conjunction with EFI extensions. Alternatively, EFI is potentially implemented on non-BIOS configurations. In other configurations, only BIOS or other hardware interface is implemented. EFI allows component and device driver programmers to create drivers that are OS independent. As a result, EFI is capable of handling system tasks, such as networking and memory management issues through delegation to firmware, instead of being managed by an operating system.

Figure 3:
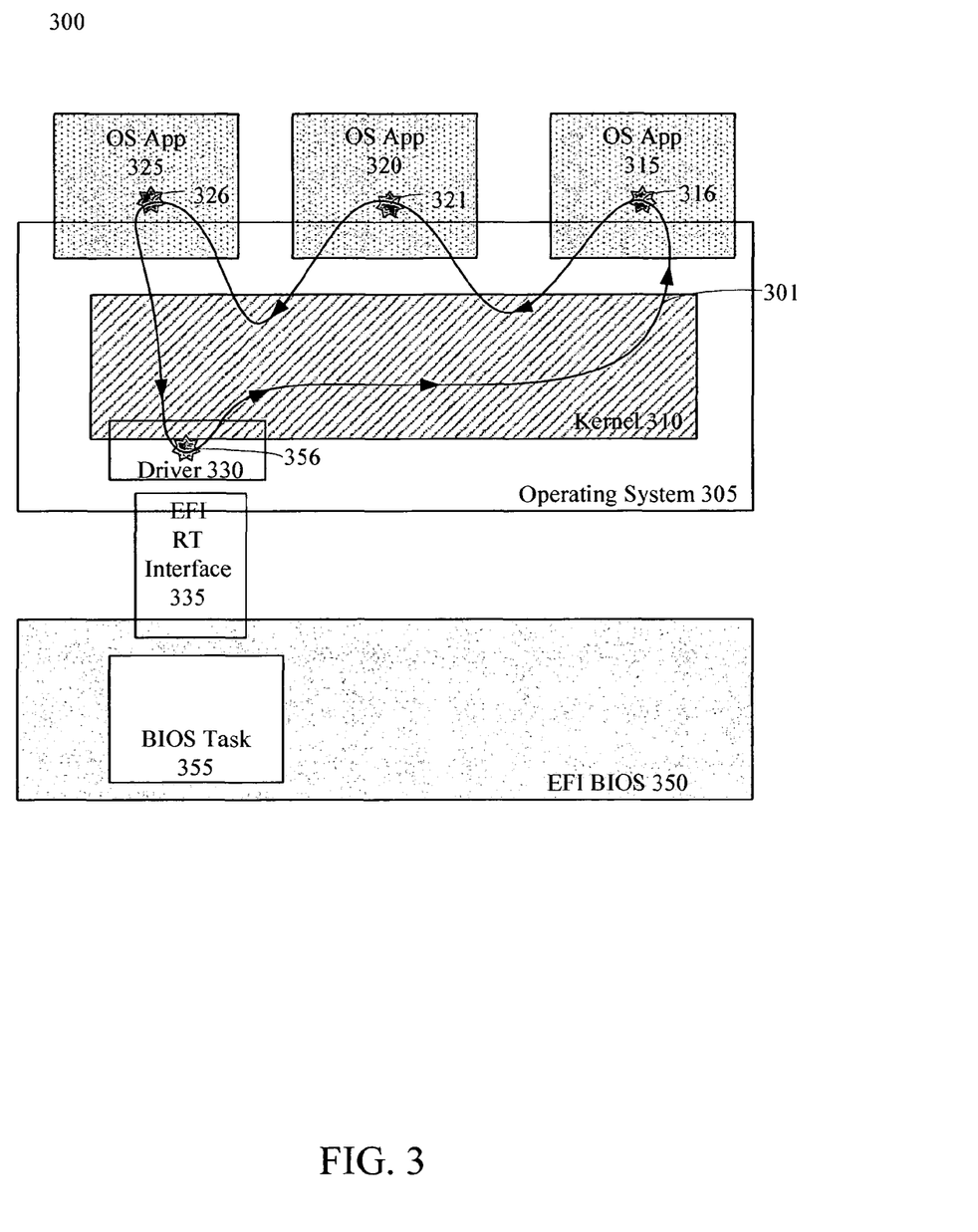
FIG. 3 illustrates another embodiment of a control path of an executing thread.

Referring next to FIG. 3, another embodiment of a control path 301 is illustrated. Similar to FIG. 2, control path 301 passes through execution points 316, 321, and 326 to execute OS application 315's, 320's, and 325's processes. However, instead of kernel 310 in operating system 305 making a call directly to a firmware task, as in FIG. 2, kernel 310 makes a call to driver 330. Driver 330 consumes the OS timeslice, but is for executing a firmware task, such as a BIOS task or EFI task 355.

In one embodiment, performing a BIOS task or an EFI task includes calling, executing, and/or accessing a driver to call a BIOS or EFI handler. Driver 330 is accessed to call a firmware/BIOS handler, execute an EFI extension, or interface with system components through extensible firmware runtime interface 335. In one embodiment, performing EFI task 355 includes accessing a driver to interface with firmware or hardware.

As an illustrative example, EFI and BIOS 350 boots and hands off control to operating system 305. Kernel 310 calls OS applications 315, 320, and 325, allocating/providing an amount of execution time to each process at execution points 316, 321, and 326. Next, an attempt by operating system 305 to access a network interface controller (NIC), which is associated with an EFI driver, is converted to a call to driver 330. Control path 301 passes through execution point 356, which is illustrated in kernel-mode driver 330. The call to driver 330 consumes timeslice 356 of OS 305's execution on a thread. However, driver 330 through runtime interface 335 accesses/ executes the appropriate EFI extension and/or driver to interface with the NIC. Essentially, the firmware task is allocated timeslice 356 for execution, even though, driver 330 consumes the timeslice from OS 305's perspective.

Figure 4A:
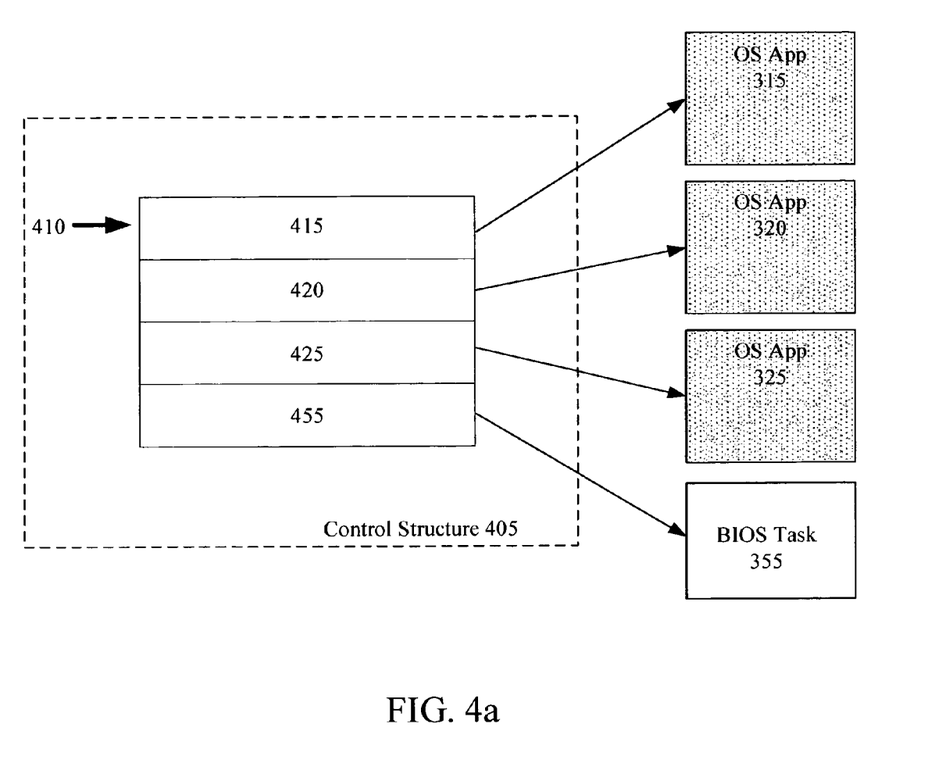
FIG. 4a illustrates an embodiment of control structure.

Scheduling of processes and tasks may be done in any manner. In one embodiment, a control data structure maintained by a kernel in an operating system is used for scheduling processes and tasks, as well as slicing execution time among the processes and tasks. Turning to FIG. 4a, an embodiment of a control structure is illustrated. Control structure 405 includes entries 415, 420, 425, and 455. In one embodiment, control structure 405 is a list of processes or tasks to be executed. As an example, a thread executing on a processor, walks control structure 405 allocating an amount of time to each entry for execution. Here, a current task, referenced by current task pointer 410, is called for execution.

As an illustrative example, entries 415, 420, and 425 correspond to OS application processes 315, 320, 325 from FIG. 3, respectively. Furthermore, entry 455 corresponds to EFI task 355. As control path 301 is traced, a call to OS application process 315 is made based on entry 415. After completion and/or execution for an amount of time, control path 301 returns to kernel 310. Pointer 410 is moved to next entry 420, and OS application process 320 is called based on entry 420. Moving forward, upon pointer 410 pointing to entry 455, a call to kernel mode driver 330 is made. Kernel mode driver 330 performs EFI task 355. As stated above, from kernel 310's perspective, driver 330 consumes the amount of execution time associated with entry 455, but a firmware task, such as EFI task 355, is being performed during that timeslice.

In the example above, control structure 405 is referred to as a simple list, such as a queue or stack of processes to be executed. In addition, pointer 410 was linearly moved to a next entry through control structure 405. As examples, in a list format, pointer 410 was simply moved to the next entry location, whereas in a stack format, the current entry is popped off the stack, leaving the next entry at the top of the stack. However, control structure 405 is potentially more robust and complex.

In fact, in one embodiment, control structure 405 is a control block resembling a linked list structure. A common control structure resembling a linked list structure utilized by operating systems is a process control block (PCB), which is also referred to as a task control block, task struct, and process struct. Much like the list structure discussed above, entries 415, 420, 425, and 455 correspond to processes 315, 320, 325, and 355, respectively. Entries 415, 420, 425, and 455 include a reference to their respective processes, as well as other information associated with each process. Moreover, not every entry in control structure 405 is required to be allocated time. More complex priority and scheduling schemes may be utilized to move pointer 410 throughout the control structure, executing processes in any order.

Figure 4B:
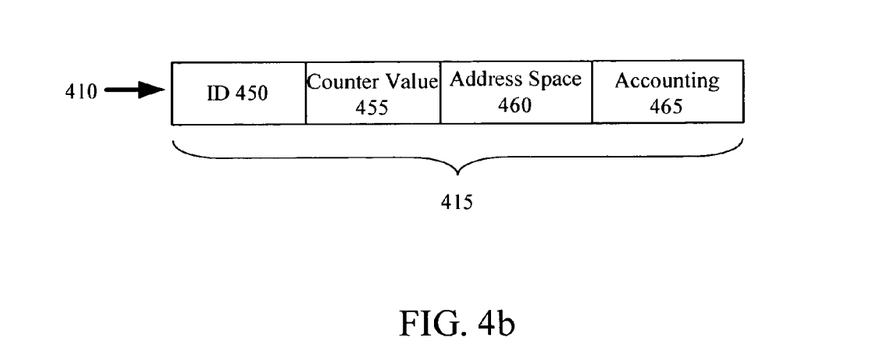

Referring down to FIG. 4b, an embodiment of entry 415 from FIG. 4a is illustrated. Entry 415 includes identifier 450 to identify OS application process 315. ID 450 includes an identifier, such as a process number, to identify process 315. Other references, such as a name or other representation, to OS process 315 may be included in ID field 450. Other fields potentially included in entry 415 include counter value 455, address space 460, and accounting field 465. In one embodiment, counter value 455 is a program counter value. Here, an actual value from/in a register or an address referencing the register is stored in counter value field 455. As an example a value in counter field 455 is to store a reference, such as an address, to a current or next instruction to be executed within process 315. In another embodiment, counter value 455 includes a counter to store a count of the number of instructions executed or an amount of time that has passed during execution of process 315. Other register values associated with process 415 may also be stored in entry 415.

Address space field 460 includes an address space associated with OS app 315. For example, a virtual or physical base address in memory and a size value allocated to OS process 315 are stored in address space field 460. Other accounting information is potentially stored in entry 415, as represented by accounting field 465. Accounting field 465 includes information, such as a last execution time of process 315, an amount of accumulated time associated with the current execution of process 315, context switch information, etc. Entry 415 may include, but is not required to include, any single or combination of the aforementioned fields, registers, and values; however, entry 415 potentially also includes fields not particularly described above.

In one embodiment, where control structure 405 is kernel-level control block, such as a process control block, a thread slices execution time between a plurality of tasks referenced in kernel control structure 405. As an illustrative example, pointer 410 is used to identify a current or next process. Here, when kernel code is being executed, a pointer to entry 415 indicates that process 315 is the next process to be executed. Based on the information in entry 415, such as process ID 450 and address space 460, a call to OS process 315 is made by the kernel. A thread allocates an amount of execution time to OS process 315, either by allowing execution of process 315 for a specific period of time or until a completion of a task.

Upon completing execution of OS app task 315, pointer 410 is moved to the next entry to be executed, entry 420. The switch from OS task 315 back to the kernel and to OS task 320 potentially includes context and/or mode switching. In a context switch, execution of a first process, such as OS application 315, is stopped, and a state of OS app 315 is stored/saved. For example, the program counter is stored into entry 415 along with other data/registers needed to restart execution of OS app 315. Then, based on the call to OS process 320, previously saved state information associated with OS app 320 is loaded. When pointer 410 reaches entry 455, data and/or state information associated with BIOS task 355 to be executed is loaded. After BIOS task 355 is executed, execution returns to entry 415 in a round-robin style scheduling. However, as stated above, any method of scheduling or priority may be used in determining processes in control structure 405 to execute. For example, instead of linearly walking through each entry, entries may be assigned a priority or queued in any order, as well as executed in any order.

Figure 5:
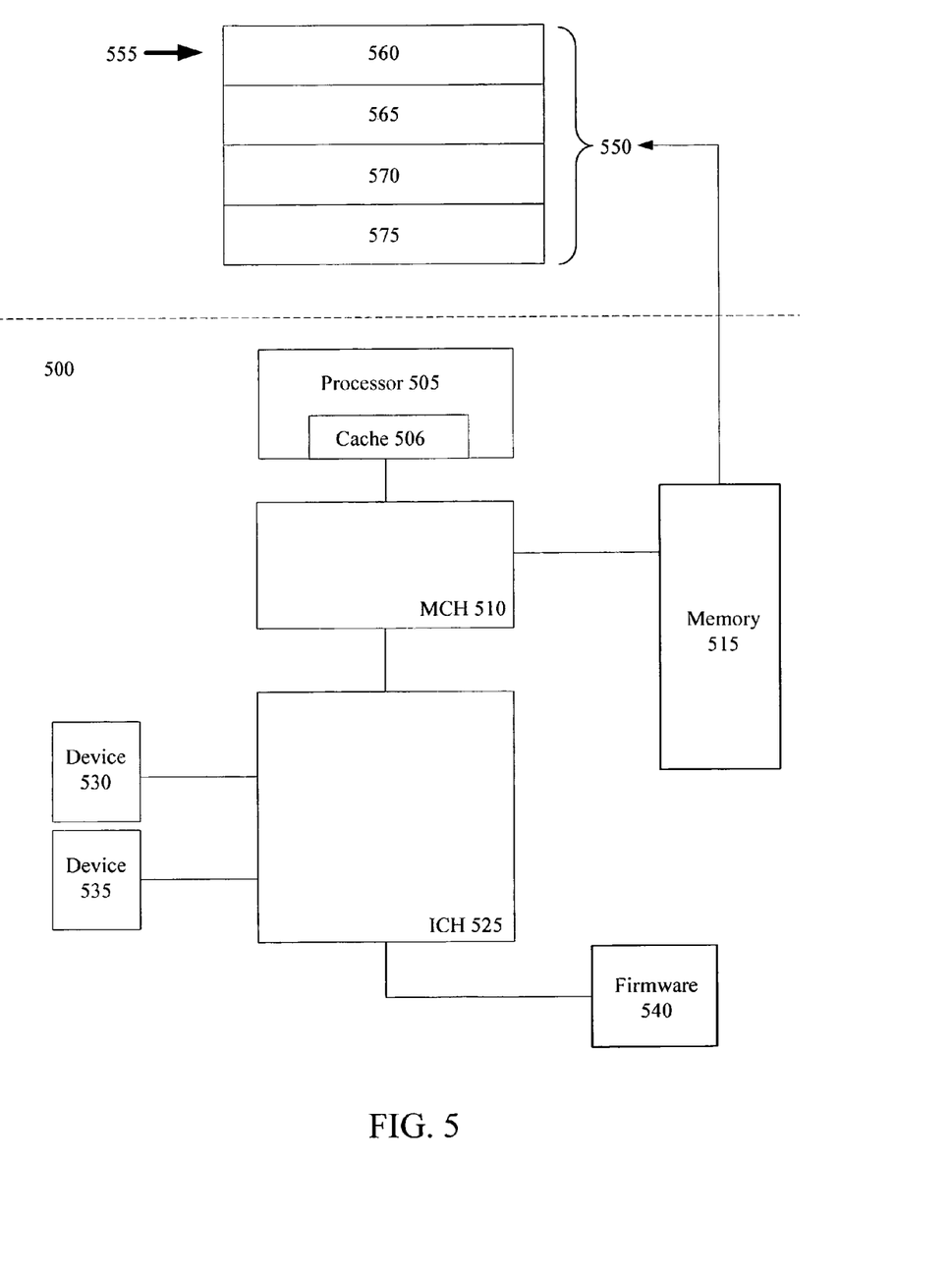
FIG. 5 illustrates an embodiment of a system including a control queue.

Turning to FIG. 5, an embodiment of a system to allocate execution time of an execution thread to a BIOS process is illustrated. Processor 505 includes any combination of the aforementioned units/blocks discussed in reference to FIG. 1. For example, processor 505 includes cache 506. In one embodiment, processor 505 is capable of executing multiple threads in parallel. For example, process 505 includes two cores, each capable of executing a single software thread for a total of two threads of execution. Alternatively, processor 505 includes eight cores, each core capable of executing two threads, for a total of 16 threads of execution. Processor 505 is coupled to system memory 515 through memory controller hub (MCH) 510. MCH 510 is coupled to system memory 515 and to interconnect controller hub (ICH) 525. Often a combination of MCH 510 and ICH 525 is referred to as a chipset, although they are often implemented on separate integrated circuits. System memory 515 often includes a random access memory (RAM), but may include any style of memory, such as a non-volatile memory.

Input/output devices 530 and 535 are coupled to ICH 525. Examples of I/O devices 530 and 535 include a network interface card (NIC), which may be a plug-in card or controller installed on a motherboard, a monitor, a printer, a disk-drive, etc. Also coupled to ICH 525 is firmware 540. In one embodiment, firmware 540 is a flash memory, such as a NAND or NOR flash memory, or other non-volatile memory device for storing basic input/output system (BIOS) code. Firmware 540 may separately or in conjunction with BIOS code store extensible firmware interface (EFI) code. Note that devices, such as device 530, potentially include their own EFI code/extensions.

In one embodiment, system memory 515 is to store kernel-level control data structure 550. Alternatively, cache 506 or other memory in system 500 is to store control data structure 550. Data structure 550 is to store references to processes to be allocated execution time on processor 505. Processor 555 is to execute an execution thread. The execution thread allocates execution time to each of the tasks referenced in entries 560, 565, 570, and 575 in control structure 550. In one embodiment, control structure 550 is a process control block (PCB). Here, the data structure resembles a linked-list or other list, where current process pointer 555 references the current processing being executed and is moved to the next process after completing execution of the current process. Control structure 550 may also be any other kind of data structure, such as a stack or a queue.

As an illustrative example, assume device 530 is inserted into system 500 at runtime, i.e. a hotplug event. In response to the insertion, BIOS generates an interrupt to notify the OS that a device has been inserted. Handling of the interrupt is scheduled as a BIOS task, which is referred to for this example as the BIOS hotplug task, to be allocated execution time. Essentially, entry 575 is created in PCB 550 to reference the BIOS hotplug task. In one embodiment, the BIOS hotplug task is referenced directly through a process ID in entry 575. In another embodiment, a driver to call a BIOS handler to handle the BIOS hotplug task is referenced in entry 575. Essentially, the BIOS hotplug task is indirectly referenced by entry 575 in this example by referencing a kernel mode driver directly, which references the BIOS hotplug task.

Currently, a thread executing on processor 505 is executing a process associated with entry 560, as represented by pointer 555. An execution path of the thread continues through tasks associated with entry 565 and 570, and pointer 555 is moved accordingly through PCB 550. In other words, a current process referenced by entry 560 is executed, then pointer 555 is walked to the next entry. In one embodiment, walking to next entry 565 includes moving the pointer to next entry 565 in PCB 550. In another embodiment, walking to next entry 565 also includes switching a context to a context associated with entry 565. After allocating execution time to processes associated with entries 560, 565, and 570, pointer 555 is moved to entry 575, which references the BIOS hotplug task. As stated above an entry, such as entry 575 includes any combination of a process ID, a counter value, an address space, accounting information, or other control block information. From this information a context switch to the BIOS hotplug task is performed.

Here, if a reference in entry 575 is directly to a process ID associated with the BIOS hotplug task, then the BIOS hotplug task is executed, i.e. the interrupt is handled accordingly. However, if a driver is referenced in entry 575, then the driver is called and consumes the execution time associated with entry 575 from the OS's perspective. Yet, the driver calls a handler to handle the interrupt accordingly. The driver potentially interfaces with BIOS/EFI through an EFI runtime interface. As stated above, although the driver is directly referenced in entry 575, the BIOS task is indirectly referenced through the driver and allocated the driver's execution time.

Other BIOS, EFI, system management, or firmware tasks may be performed in a similar manner. For example, upon generating a system management interrupt (SMI), the handling of the SMI is scheduled and executed during an allocated slice of time by the OS, instead of immediately interrupting the OS's execution.

Figure 6:
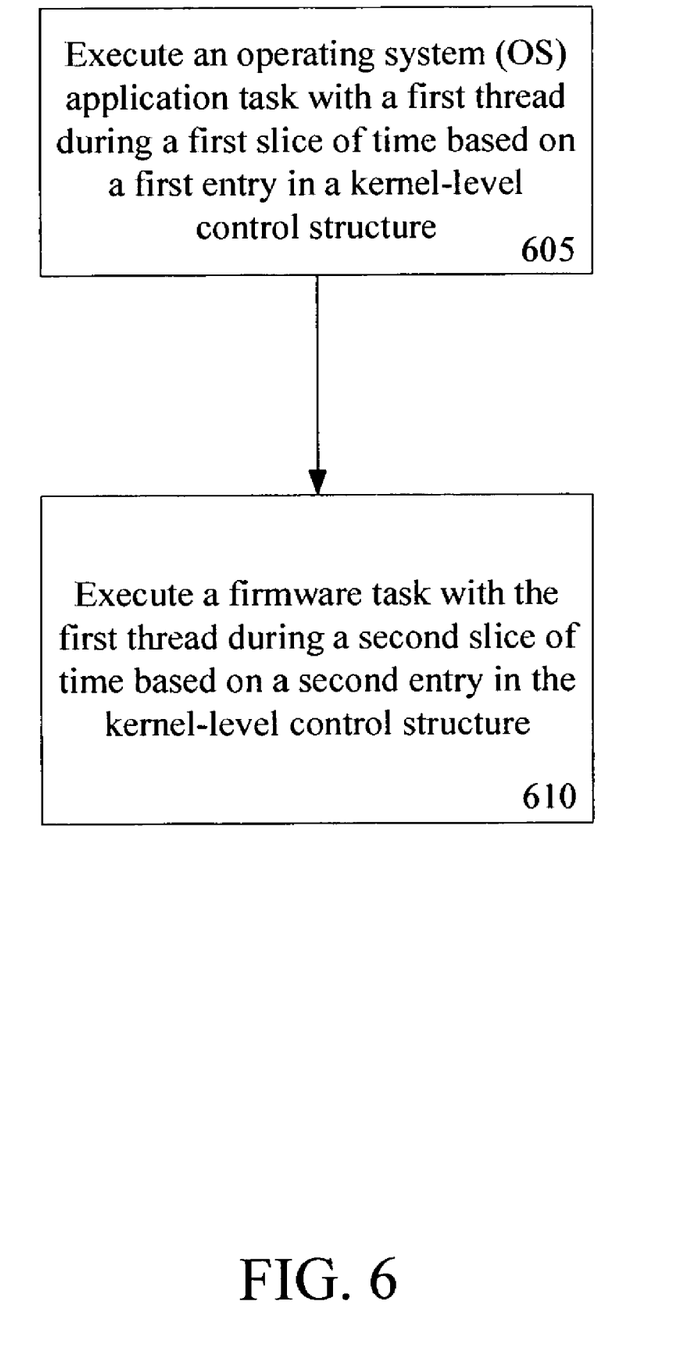
FIG. 6 illustrates an embodiment of a flow diagram for a method of executing a BIOS task.

Referring next to FIG. 6, an embodiment of a flow diagram for a method of executing a firmware task during runtime is illustrated. In flow 605, an operating system application task is executed with a first thread during a first slice of time based on a first entry in a kernel-level control structure. In one embodiment, the kernel-level control structure is a process control block (PCB) including a plurality of entries that references processes through a process identifier stored in each entry. When a control pointer points to the first entry, a kernel calls the OS application referenced by the first entry. The OS application, is then executed for a period of time or until a task is completed.

Next, in flow 610 a firmware task is executed with the first thread during a second slice of time based on a second entry in the kernel-level control structure. Continuing the example from above, after executing the OS application task, the context of the first thread is switched to the firmware task. In one embodiment, the context of the OS application task is saved to the PCB, and a context for the firmware task is loaded from the PCB. Then the thread executes the firmware task referenced by the second entry in the PCB.

Examples of firmware tasks include performing an OS independent task, performing a system management operation, handling a system management interrupt, servicing a system management request, accessing a driver, executing driver code, performing an extensible firmware interface (EFI) task, and executing an extensible firmware interface (EFI) extension.

In one embodiment, a kernel-mode driver for firmware scheduling is referenced by the second entry. In this case, a kernel mode driver is called by the kernel, as the second entry references the driver. The driver, when executed, is to schedule/perform the firmware task. Essentially, instead of altering current operating systems to interface directly with firmware, a driver is written to handle the interface, such as an EFI interface. As a result, from the OS's perspective the driver is consuming the second time slice; however, the driver is actually scheduling the firmware task to be executed during the second time slice. Alternatively, the OS interfaces directly with the firmware, and the second entry simply references the firmware task directly.

Figure 7:
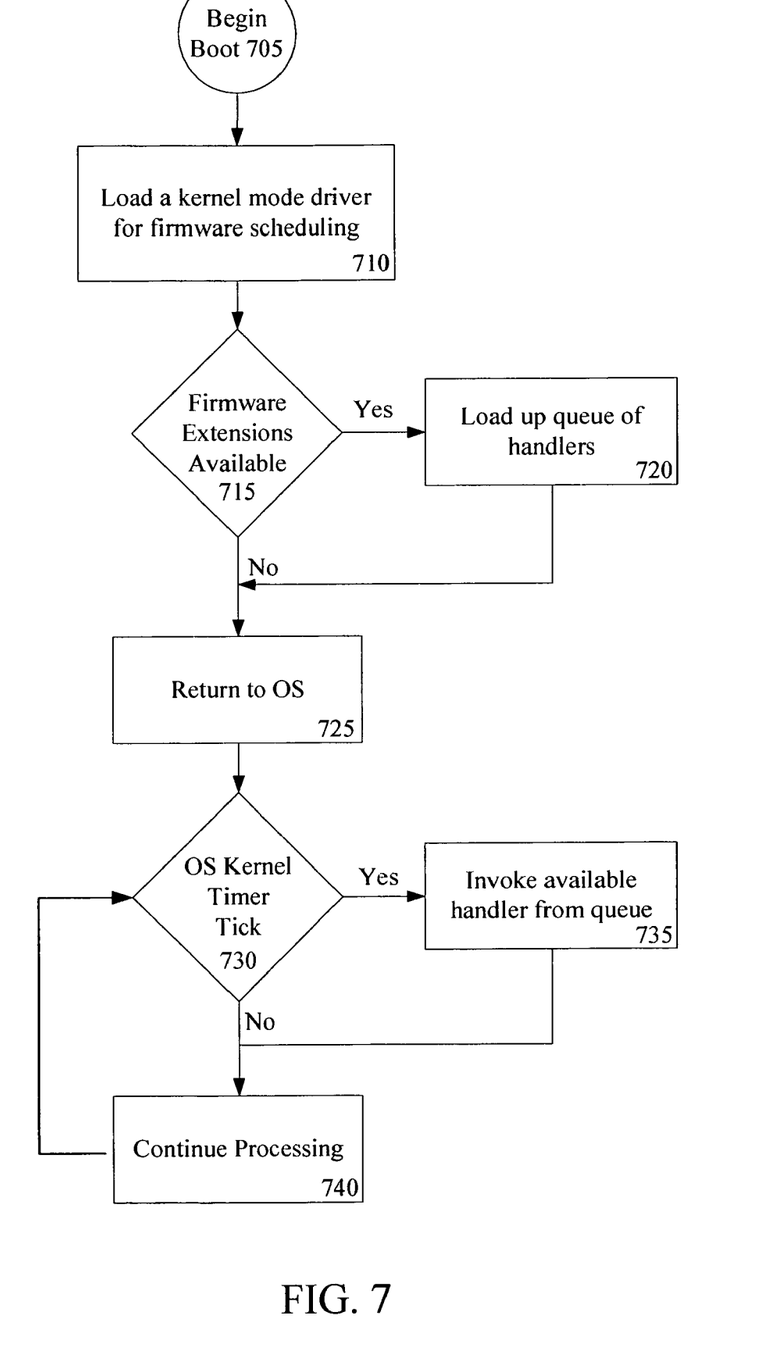
FIG. 7 illustrates an embodiment of a flow diagram for a method of loading a kernel mode driver for firmware scheduling.

As an illustrative embodiment, FIG. 7 shows a flow diagram of utilizing a kernel mode driver. In flow 705, boot/initialization of a system is begun. In one embodiment, BIOS is to boot the system and hand over control to an OS. As another example, EFI either in conjunction with BIOS or separately initializes the system. In flow 710, a kernel mode driver for firmware scheduling is loaded. As noted above, the kernel mode driver, in one embodiment, is to schedule/perform firmware tasks. For example, upon receiving a system management interrupt (SMI), the driver is to call a handler to handle the SMI. In another example, if a firmware extension is to be executed, the driver is to call the appropriate EFI handler.

In flow 715, BIOS detects if firmware extensions, such as extensions provided in newly added I/O devices, are present. If extensions are available, then a queue of handlers is loaded in flow 720. Next, control is handed off to an operating system in flow 725.

During OS runtime execution, a thread slices execution among a plurality of tasks. When a firmware task is to be executed, an access to the kernel-mode driver is scheduled. The kernel mode driver is accessed, i.e. called, upon an appropriate slice of the thread's execution. In one embodiment, upon an OS kernel timer tick in flow 730, the kernel mode driver is accessed/executed. In flow 735, the appropriate handler is invoked by the kernel mode driver to execute the firmware task. As an example, the driver interfaces with firmware though an extensible firmware runtime interface. In flow 740, processing of other tasks, such as OS tasks, continues.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

As illustrated above, an operating system (OS) is able to provide quality of service, since it is able to predict and schedule firmware tasks. Previously, in performing a firmware task, such as handling a system management interrupt (SMI), in response to the SMI, the OS would be interrupted and the SMI handled asynchronously. However, by scheduling firmware tasks in a control structure, such as a process control block (PCB), the firmware tasks are executed in slices at OS runtime. Furthermore, a kernel-mode driver is potentially implemented to allow and OS to make a call to a driver, rather than providing full support to firmware. During execution of the kernel mode driver, the driver consumes the execution time slice, from the OS's perspective. Yet, the driver calls appropriate handlers to perform the firmware tasks.

In the foregoing specification, a detailed description has been given with reference to specific exemplary embodiments. It will, however, be evident that various modification and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A machine readable medium to store OS kernel code, which when executed by a machine, causes the machine to perform the operations of:
   maintaining a process control block (PCB) adapted to hold a plurality of process entries to be allocated an amount of execution time on the machine during OS runtime; and
   allocating an amount of execution time of a logical processor in the machine for execution of active firmware code as a co-equal agent during operating system (OS) runtime to perform a system management task based on a process entry of the plurality of process entries including a reference to the active firmware code.

2. The machine readable medium of claim 1, wherein the active firmware code includes active basic input/output system (BIOS) code stored on a flash memory device.

3. The machine readable medium of claim 2, wherein the active firmware code further includes extensible firmware interface (EFI) code.

4. The machine readable medium of claim 1, wherein each of the plurality of process entries comprise:
   a process identifier;
   a program counter value for the process;
   an address space for the process; and
   process accounting information.

5. A machine readable medium to store code, which when executed by a machine, causes the machine to perform the operations of:
   maintaining a plurality of task entries in an Operating System (OS) kernel-level control block, wherein at least one of the plurality of task entries in the OS kernel-level control block includes a reference to a basic input/output software (BIOS) associated task; and allocating an amount of execution time to BIOS code to perform the BIOS associated task during OS runtime without entering a system management mode in response to a task pointer referencing the BIOS associated task in the OS kernel-level control block.

6. The machine readable medium of claim 5, wherein the plurality of task entries in the kernel-level control block includes a first application associated task and the BIOS associated task.

7. The machine readable medium of claim 6, wherein the code, which when executed by the machine, causes the machine to further perform the operations of:

allocating executing time to a first application associated task in response to the task pointer referencing the first application associated task in the OS kernel-level control block;

stopping execution of the first application associated task;

copying a state of the first application associated task to the OS kernel-level control block;

advancing the task pointer from referencing the first application associated task in the OS kernel-level control block to referencing the BIOS associated task in the OS kernel-level control block;

allocating execution time to BIOS code to perform the BIOS associated task during OS runtime without entering a system management mode in response to a task pointer referencing the BIOS associated task in the OS kernel-level control block; and in response to allocating execution time to the BIOS code, loading a state of the BIOS associated task; and executing the BIOS associated task.

8. The machine readable medium of claim 5, wherein the basic input/output software (BIOS) associated task comprises: executing an OS kernel driver to call a BIOS handler to service an asynchronous system management interrupt.

9. The machine readable medium of claim 5, wherein the BIOS code includes extensible firmware runtime interface code.

10. The machine readable medium of claim 5, wherein the code includes Operating System (OS) code.

11. A system comprising:

a memory to store operating system (OS) code and an OS kernel-level control block, the OS control block to store a plurality of process entries for a plurality of processes to be allocated execution time, wherein at least one of the process entries for the plurality of processes includes a reference to an active firmware process; and a processor coupled to the memory to execute the OS code to allocate execution time to each of the plurality of processes referenced in the control block, including an amount of execution time for the active firmware process during the OS runtime.

12. The system of claim 11, wherein the processor to execute the OS code to allocate execution time to each of the plurality of process in the control block comprises:

walking to a next reference for a next process of the plurality of processes in the control block;

executing the next process; and repeating walking to the next reference and executing the next process for each process in the control block.

13. The system of claim 11, wherein the kernel-level control block is a process control block having a list data structure, and wherein walking to the next reference for the next process includes moving a pointer from a current reference for a current process of the plurality of processes to the next reference for the next process.

14. The system of claim 12, wherein the kernel-level control block is a process control stack, and wherein walking to the next reference for the next process includes popping a current reference for a current process of the plurality of processes off the process control stack.

15. The system of claim 11, wherein a reference to a process comprises:

a process identifier; and an address space associated with the process.

16. The system of claim 15, wherein the reference to the BIOS process comprises:

an identifier for a kernel mode driver, the kernel mode driver, when executed, to call a BIOS handler associated with the BIOS process; and an address space associated with the kernel mode driver.

17. A method comprising:

maintaining an OS kernel level control block adapted to hold a first entry and a second entry to be allocated execution time during runtime of an operating system (OS);

executing, during runtime of the operating system (OS), an OS application task with a first thread during a first slice of time based on a reference to the first entry in an OS kernel-level control block; and executing, during runtime of the OS, a firmware task with the first thread during a second slice of time based on a reference to the second entry in the OS kernel-level control block without entering a system management mode.

18. The method of claim 17, wherein the kernel-level control block is a process control block.

19. The method of claim 17, wherein executing a firmware task with the first thread during the second slice of time based on the second entry in the kernel-level control block comprises:

executing driver code, which is referenced in the second entry in the kernel-level control block, to call a firmware handler, upon entering the second slice of time.

20. The method of claim 17, further comprising switching a context of the thread to the firmware task, before executing the firmware task.

21. The method of claim 17, wherein the firmware task comprises an active firmware task to be serviced without exiting OS runtime, the active firmware task to be selected from the group consisting of performing an OS independent task, performing a basic input/output system (BIOS) task, performing a system management operation, handling a system management interrupt, servicing a system management request, accessing a driver, executing driver code, performing an extensible firmware interface (EFI) task, and executing an extensible firmware interface (EFI) extension.

22. A method comprising:

scheduling execution of a kernel mode driver in an entry of an operating system (OS) kernel control block in response to receiving a system management interrupt (SMI), the kernel mode driver to be allocated an amount of execution time during OS runtime; and allocating the amount of execution time during OS runtime execution on a processor to the kernel mode driver based on scheduling the kernel mode driver in the entry of the OS kernel control block, wherein the kernel mode driver, when executed, is to schedule service of the SMI without entering a system management mode.

23. The method of claim 22, wherein the OS kernel control block comprises an OS process control block (PCB).

24. The method of claim 23, wherein a task pointer points to a current task of a plurality of tasks, including the kernel mode driver, in the PCB.

25. The method of claim 22, wherein the kernel mode driver, when executed, is to schedule service of the SMI without entering a system management mode comprises the kernel mode driver, when executed, to call a firmware handler routine, which when executed, is to service the SMI during the time-slice of OS runtime execution allocated on the processor without entering the system management mode.

26. The method of claim 22, wherein the kernel mode driver, when executed, is to interface with firmware using an extensible firmware runtime interface.

27. A machine readable medium to store operating system code, which when executed by a machine, is to cause the machine to perform the operations of claim 22.

* * * * *